United States Patent
Takayanagi et al.

(10) Patent No.: US 9,683,631 B2
(45) Date of Patent: Jun. 20, 2017

(54) HYDRAULIC SYSTEM FOR VEHICLE

(71) Applicant: TOYOTA JIDOSHA KABUSHIKI KAISHA, Toyota-shi, Aichi (JP)

(72) Inventors: Ryota Takayanagi, Toyota (JP); Akiko Nishimine, Toyota (JP); Hiroaki Kimura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 116 days.

(21) Appl. No.: 14/845,750

(22) Filed: Sep. 4, 2015

(65) Prior Publication Data

US 2016/0069428 A1    Mar. 10, 2016

(30) Foreign Application Priority Data

Sep. 8, 2014 (JP) .................. 2014-182352

(51) Int. Cl.
*F16D 31/02* (2006.01)
*F16H 3/00* (2006.01)
(Continued)

(52) U.S. Cl.
CPC ............. *F16H 3/006* (2013.01); *B60K 6/365* (2013.01); *B60K 6/383* (2013.01); *B60K 6/445* (2013.01); *F15B 11/17* (2013.01); *F15B 13/027* (2013.01); *F16H 3/44* (2013.01); *F16H 3/727* (2013.01); *F16H 57/0441* (2013.01); *F16H 57/0476* (2013.01); *F16H 61/0031* (2013.01); *F15B 2211/20515* (2013.01); *F15B 2211/20523* (2013.01); *F16H 2037/0866* (2013.01); *Y02T 10/6239* (2013.01); *Y10S 903/91* (2013.01)

(58) Field of Classification Search
CPC .......... F16H 3/006; F16H 3/727; F16H 3/005; F16H 61/0031; F16H 61/0441
USPC ............................ 137/111, 114, 605; 60/420
See application file for complete search history.

(56) References Cited

U.S. PATENT DOCUMENTS 4,445,818 A    5/1984 Ohsaki et al.
2010/0018808 A1    1/2010 Gloge
(Continued)

FOREIGN PATENT DOCUMENTS

DE              3206353 C2    9/1982
DE       102007012716 A1    9/2008
(Continued)

*Primary Examiner* — Thomas E Lazo
*Assistant Examiner* — Daniel Collins
(74) *Attorney, Agent, or Firm* — Andrews Kurth Kenyon LLP (57) ABSTRACT

A downsized hydraulic system for a vehicle having a mechanical oil pump and an electric oil pump is provided. The hydraulic system comprises a first check valve allowing oil to flow only from the mechanical oil pump to an oil requiring site, and a second check valve allowing oil to flow only from the electric oil pump to an oil requiring site. The first check valve comprises a first port connected to an outlet of the mechanical oil pump, a second port connected to an outlet port of the second check valve, and a third port connected to the oil requiring site. The first check valve is adapted to provide a communication among those three ports by opening the first port, and provided with a through guide allowing the oil to flow between the second port and the third port even when the first port is closed.

5 Claims, 8 Drawing Sheets (51) Int. Cl.
*B60K 6/365* (2007.10)
*F15B 11/17* (2006.01)
*F15B 13/02* (2006.01)
*F16H 3/44* (2006.01)
*F16H 57/04* (2010.01)
*F16H 61/00* (2006.01)
*B60K 6/383* (2007.10)
*B60K 6/445* (2007.10)
*F16H 3/72* (2006.01)
*F16H 37/08* (2006.01)

(56) References Cited

U.S. PATENT DOCUMENTS

2011/0166727 A1\* 7/2011 Light .................... B60K 6/445
 701/22
2012/0055146 A1 3/2012 Baraga et al.
2013/0017915 A1\* 1/2013 Miyata ................... B60K 6/365
 475/5

FOREIGN PATENT DOCUMENTS

| DE | 102008040665 A1 | 6/2010 |
| DE | 102009019959 A1 | 11/2010 |
| JP | H05-061453 U | 8/1993 |
| JP | 2006-283809 A | 10/2006 |
| JP | 2009-127859 A | 6/2009 |

\* cited by examiner

HYDRAULIC SYSTEM FOR VEHICLE

The present invention claims the benefit of Japanese Patent Applications No. 2014-182352 filed on Sep. 8, 2014 with the Japanese Patent Office, the disclosures of which are incorporated herein by reference in its entirety.

BACKGROUND

Field of the Invention

The present invention relates to a hydraulic system for a vehicle having a mechanical oil pump that is driven by a prime mover such as an engine and a motor and an electric oil pump that is activated by its own electric motor.

Discussion of the Related Art

JP-A-2006-283809 describes an automatic transmission for a vehicle having an engine start/stop system and a hydraulic circuit to operate friction engagement elements such as a clutch and a brake. The hydraulic circuit has a hydraulic power source including a mechanical oil pump driven by an engine and an electric oil pump driven by its own electric motor other than the prime mover of the vehicle. A discharging side of the electric oil pump is connected to a drain passage for the mechanical oil pump through a check valve in a manner to prevent back flow of the oil discharged from the mechanical oil pump. In order to regulate pressure of the oil discharged from the electric oil pump to a predetermined level, a regulator valve is disposed between the electric oil pump and an upstream side of the check valve. When the engine is stopped by the engine start/stop system, the electric oil pump is driven to generate hydraulic pressure, and the pressurized oil is delivered to the automatic transmission.

JP-A-2009-127859 also describes a transmission having an engine start/stop system. The transmission taught by JP-A-2009-127859 also comprises a hydraulic circuit, an electric oil pump and a mechanical oil pump driven by the prime mover. According to the teachings of JP-A-2009-127859, a rotary vane pump in which oil is allowed to flow therethrough even when the pump is stopped is used as the mechanical oil pump, and a gear pump in which oil is not allowed to flow therethrough when the pump is stopped is used as the electric oil pump. JP-A-2009-127859 also describes a hydraulic circuit in which the mechanical pump is arranged parallel to the electric oil pump as a prior art.

Thus, as taught by JP-A-2006-283809 and JP-A-2009-127859, the vehicle having the engine start/stop system and the hybrid vehicle having the engine and the motor as the prime mover are provided not only with the mechanical oil pump driven by the engine but also with the electric oil pump driven by its own electric motor other than the prime mover. In those kinds of vehicles, an oil delivery can be continued by the electric oil pump even if the mechanical oil pump is stopped by stopping the engine.

In the vehicle having both mechanical oil pump and electric oil pump, a check valve and a regulator valve are used in the hydraulic system for delivering oil from those pumps to oil requiring sites. The check valve is adapted to prevent back flow of the oil discharged from one of the oil pumps. In the transmission taught by JP-A-2006-283809, the regulator valve is arranged to regulate pressure of the oil discharged from the electric oil pump to a desired level. Thus, in the vehicle having both mechanical oil pump and electric oil pump, the check valve and the regulator valve are used in the hydraulic system, and hence dimensions and cost of the hydraulic system have to be increased in comparison with conventional vehicles having no electric oil pump.

The present invention has been conceived noting the foregoing technical problems, and it is therefore an object of the present invention is to downsize a hydraulic system for a vehicle having mechanical and electric oil pumps and to reduce a cost thereof.

SUMMARY OF THE INVENTION

The hydraulic system of the present invention is applied to a vehicle, comprising: a first oil pump that is driven by a prime mover of a vehicle to generate hydraulic pressure; a second oil pump that is driven by its own electric motor other than an electric motor serving as the prime mover to generate hydraulic pressure; an oil requiring site to which the oil discharged from the first oil pump and the second oil pump is delivered; a first check valve that is disposed between an oil requiring site to which the oil discharged from the first oil pump or the second oil pump is delivered, and that is adapted to allow the oil to flow only in a direction from the first oil pump toward the oil requiring site by opening an inlet port; and a second check valve that is disposed between the oil requiring site and the second oil pump, and that is adapted to allow the oil to flow only in a direction from the second oil pump toward the oil requiring site by opening an inlet port. The first check valve comprises a first port as the inlet port that is connected to an outlet of the first oil pump, a second port that is connected to an outlet port of the second check valve, and a third port that is connected to the oil requiring site. The first check valve is adapted to provide a communication among those three ports by opening the first port. In addition, the first check valve further comprises a through guide that allows the oil to flow between the second port and the third port even when the first port is closed.

The through guide of the first check valve may serve as a flow rate adjuster of the oil flowing through a passage from the second oil pump to the oil requiring site through the second check valve.

The oil flowing through the through guide may be delivered to the oil requiring site at which a requiring amount of the oil is relatively small.

The hydraulic system may be applied to a hybrid vehicle comprising: an engine, a first motor and a second motor serving as the prime mover; a planetary gear unit serving as a power distribution device that distributes a power of the engine to the first motor and to an output member by a differential action; and a transmission that is connected to the second motor, and that transmits the power between the output member and the driving wheels. In this case, the oil flowing through the through guide is delivered to at least the planetary gear unit.

In the hydraulic system, the hydraulic source includes the first oil pump driven by the prime mover and the electric oil pump driven by its own electric motor. The first and the second oil pumps are provided with the first and the second check valve respectively to prevent backflow of the oil discharged therefrom. The first check valve also serves as a part of an oil passage connecting the outlet of the second check valve to the oil requiring sites. To this end, the first check valve is provided with the through guide provides a communication between the outlet of the second check valve and the oil requiring sites even if it is closed. According to the present invention, therefore, the hydraulic system can be downsized by thus using the first check valve also as a part of the oil passage to save an inner space of the system.

As described, the through guide of the first check valve also serves as a flow rate adjuster of the oil flowing between the outlet of the second check valve and the oil requiring site. That is, the through guide also serves as an orifice for adjusting a flow rate of the oil flowing through the passage between the second check valve and the oil requiring site. For this reason, in the hydraulic system, number of parts can be reduced so that the hydraulic system can be downsized. In addition, cost for forming the orifice can be saved.

Specifically, the oil flowing through the through guide of the first check valve is delivered to the site requiring a relatively small amount of the oil. Therefore, the flow rate of the oil being delivered to the oil requiring sites may be adjusted properly on the way.

As also described, the hydraulic system of the present invention may be applied to the hybrid vehicle comprising the engine, the first motor, the second motors, and the planetary gear unit serving as the power distribution device. In this case, the oil flowing through the first check valve may be delivered to the planetary gear unit while adjusting the flow rate thereof on the way.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENTS

Figure 1:
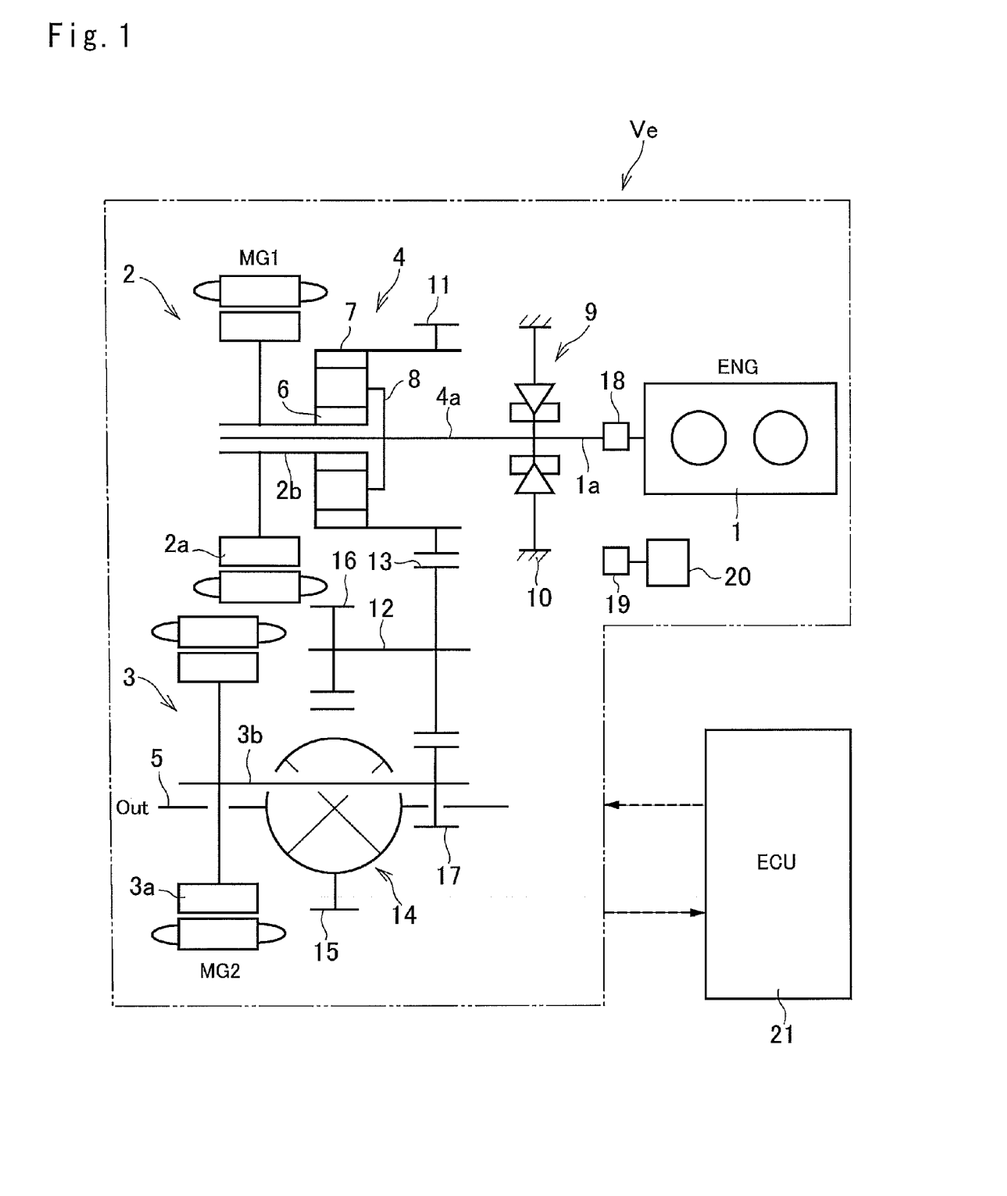
FIG. 1 is a schematic illustration showing one example of the vehicle to which the present invention is applied.

Referring now to FIG. 1, there is shown a preferred example of a structure of a vehicle to which the present invention is applied. The vehicle shown therein has a mechanical oil pump that is driven by a prime mover to generate hydraulic pressure, and an electric oil pump that is activated by its own electric motor other than the prime mover to generate hydraulic pressure. The vehicle is configured to maintain a delivery of oil by activating the electric oil pump when the prime mover is temporary stopped during propulsion of the vehicle or a during the vehicle stops temporarily. For example, the prime mover can be stopped temporarily in a vehicle having an engine start/stop system that stops the engine while the vehicle is stopping, or in a hybrid vehicle having an engine and a motor as the prime mover.

FIG. 1 shows a hybrid vehicle Ve in which a prime mover includes an engine 1 (referred to as "ENG" in FIG. 1), a first motor-generator 2 (referred to as "MG1" in FIG. 1), and a second motor-generator 3 (referred to as "MG2" in FIG. 1). A power of the engine 1 is distributed to the first motor-generator 2 side and to a drive shaft 5 side through a power distribution device 4. Meanwhile, an electric power generated by the first motor-generator 2 is supplied to the second motor-generator 3 so that the second motor-generator 3 is driven to generate a power for assisting driving force to rotate the drive shaft 5.

The engine 1 is started and stopped electrically, and output power thereof is also adjusted electrically. Specifically, given that a gasoline engine is used as the engine 1, an opening degree of a throttle valve, an amount of fuel supply, a commencement and a termination of ignition, an ignition timing etc. are controlled electrically.

In this preferred example, a permanent magnet type synchronous motor having a generating function is used individually as the first motor-generator 2 and the second motor-generator 3. Each of the first motor-generator 2 and the second motor-generator 3 is individually connected with a not shown battery through a not shown inverter to control a rotational speed and a torque thereof so that the motor-generators 2 and 3 can be operated selectively as a motor and a generator responsive to a current applied thereto.

Specifically, in the example shown in FIG. 1, the power distribution device 4 is a single pinion type planetary gear unit adapted to perform a differential action among three rotary element such as a sun gear 6, a ring gear 7 and a carrier 8.

The planetary gear unit serving as the power distribution device 4 is arranged coaxially with an output shaft 1a of the engine 1, and the first motor-generator 2 is situated on an opposite side of the engine 1 across the power distribution device 4. The sun gear 6 of the power distribution device 4 is connected with a rotary shaft 2b rotated integrally with a rotor 2a of the first motor-generator 2, and the ring gear 7 as an internal gear is situated concentrically with the sun gear 6. A plurality of pinion gears are interposed between the sun gear 6 and the ring gear 7 while meshing with those gears, and those pinion gears are supported by the carrier 8 connected with an input shaft 4a of the power distribution device 4 in a rotatable and revolvable manner. The input shaft 4a is connected with the output shaft 1a of the engine 1 through a one-way brake 9.

The one-way brake 9 is disposed between the output shaft 1a or the carrier 8 and a fixed member 10 such as a housing. Specifically, the one-way brake 9 is brought into engagement to stop rotation of the engine 1 when torque is applied to the output shaft 1a or the carrier 8 in a direction to rotate in a counter direction. That is, the rotation of the output shaft 1a or the carrier 8 can be stopped by the one-way brake 9 depending on the direction of the torque applied thereto.

A drive gear 11 is an external gear that is formed around the ring gear 7 of the power distribution device 4 integrally therewith, and a countershaft 12 is arranged in parallel with a common rotational axis of the power distribution device 4 and the first motor-generator 2. A counter driven gear 13 is fitted onto one of the end portions of the countershaft 12 (i.e., right side in FIG. 1) in a manner to be rotated therewith while being meshed with the drive gear 11. A counter drive gear 16 is fitted onto the other end portion of the countershaft 12 (i.e., left side in FIG. 1) in a manner to be rotated therewith while being meshed with a ring gear 15 of a deferential gear unit 14 serving as a final reduction. Thus, the ring gear 7 of the power distribution device 4 is connected with the drive shaft 5 through the drive gear 11, the countershaft 12, the counter driven gear 13, the counter drive gear 16, and the deferential gear unit 14.

Torque of the second motor-generator 3 can be added to torque transmitted from the power distribution device 4 to the drive shaft 5. To this end, the second motor-generator 3 is arranged in parallel with the countershaft 12, and a reduction gear 17 connected with a rotor shaft 3b rotated integrally with a rotor 3a is meshed with the counter driven gear 13. That is, the ring gear 7 of the power distribution device 4 is connected with the drive shaft 5 and the second motor-generator 3 through the aforementioned gear train or the reduction gear 17.

The vehicle Ve is provided with two oil pumps such as a first oil pump 18 and a second oil pump 19 to cool and lubricate the motor-generators 2 and 3 the power distribution device 4.

The first oil pump 18 is a mechanical oil pump conventionally used for an engine or a transmission of automobiles to supply lubrication oil and to generate hydraulic pressure. The first oil pump (to be simply called as the "MOP" hereinafter) 18 is activated by torque of the engine 1 to establish hydraulic pressure.

As described, the MOP 18 is driven by the engine 1, and therefore the MOP 18 is stopped to be disabled to establish hydraulic pressure when the engine 1 is stopped. In order to ensure oil delivery to an oil requiring site such as the motor-generators 2 and 3 and the power distribution device 4 even when the engine 1 is stopping, the vehicle Ve is provided with the second oil pump 19.

The second oil pump 19 (to be simply called as the "EOP" hereinafter) is an electric oil pump that is driven by a torque of an electric motor to establish hydraulic pressure. To this end, a pumping motor 20 is arranged in the vehicle Ve in addition to the first motor-generator 2 and the second motor-generator 3.

According to the preferred example, the control system is provided with an electronic control unit (abbreviated as the "ECU" hereinafter) 21 for controlling the engine 1, the first motor-generator 2, the second motor-generator 3, and the pumping motor 20. The ECU 21 is comprised of a microcomputer configured to carry out a calculation based on incident data and preinstalled data, and to transmit a calculation result in the form of command signal.

Operation mode of the hybrid vehicle Ve is selected in an optimally fuel or energy efficient manner. Specifically, the drive mode of the vehicle Ve is selected from HV mode where the vehicle Ve is powered at least by the engine 1, and EV mode where the vehicle Ve is powered at least one of the motor-generators 2, 3 while stopping the engine 1.

The EV mode can be selected depending on a running condition from first EV mode where the vehicle Ye is powered by the second motor-generator 3, and second EV mode where the vehicle Ve is powered by both the first and second motor-generators 2, 3.

Under the first EV mode, the second motor-generator 3 is operated as a motor to generate torque by rotating in a forward direction (i.e., a rotational direction of the output shaft 1a of the engine 1) so that the vehicle Ve is propelled by the second motor-generator 3.

Under the second EV mode, the vehicle Ve is powered by both of the first and the second motor-generators 2, 3. In this case, the first motor-generator 2 is rotated in a counter direction (a reverse direction against a rotational direction of the output shaft 1a of the engine 1) to generate torque, but the second motor-generator 3 is also rotated in the forward direction to generate torque. In this situation, torque in a counter direction is applied to the output shaft 1a of the engine 1 so that the one-way brake 9 is brought into engagement. Consequently, the vehicle Ve is allowed to be propelled efficiently by the motor-generators 2 and 3 while stopping a rotation of the engine 1.

Thus, the operation mode is switched between the HV mode and the EV mode depending on a running condition and a demanded driving force. As stated above, under the EV mode, the engine 1 is stopped and hence the MOP 18 is not allowed to generate hydraulic pressure. However, under the first EV mode, the oil is required to lubricate and cool the second motor-generator 3. Likewise, under the second EV mode, the oil is required to lubricate and cool the power distribution device 4 as well as the motor-generators 2 and 3. According to the preferred example, therefore, the EOP 19 is driven by activating the pumping motor 20 to generate the hydraulic pressure when the EV mode is selected or when the engine 1 is stopped. Given that the vehicle Ve is a Plug in Hybrid Vehicle (to be abbreviated as "PHV" hereinafter) in which a battery for propelling the vehicle can be charged by an external electric power source, the EV mode would be selected more frequently in comparison with the conventional hybrid vehicle. That is, if the vehicle Ve is the PHV, the EOP 19 is activated more frequently to generate hydraulic pressure.

Given that the hydraulic system of the preferred example is applied to the vehicle provided with the engine start/stop system, the pumping motor 20 is activated to drive the EOP 19 to generate hydraulic pressure when the vehicle is stopped by the engine start/stop system.

Figure 2:
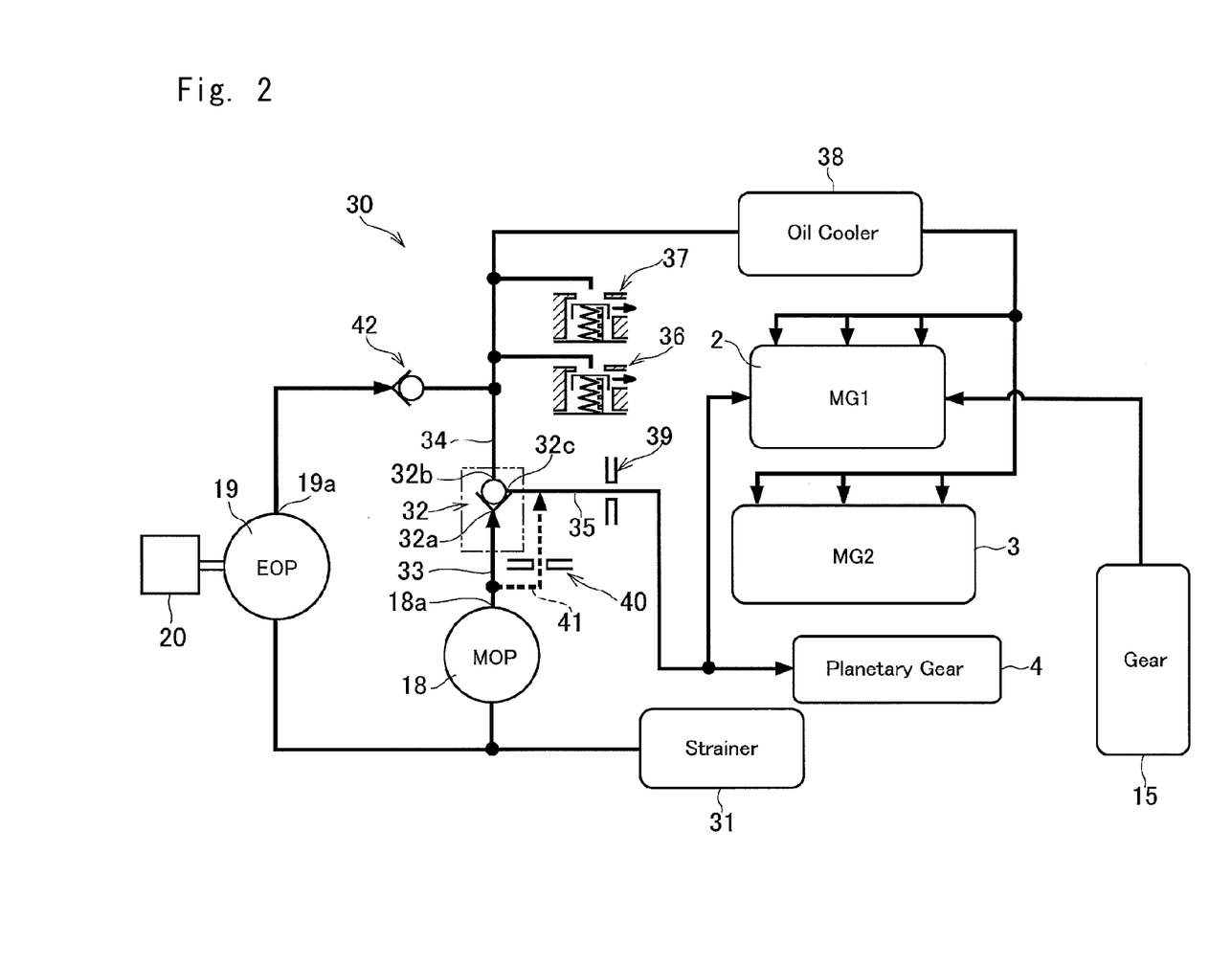
FIG. 2 is a view showing one example of a hydraulic circuit according to the present invention.

Turning to FIG. 2, there is shown one example of a hydraulic system using the MOP 18 and the MOP 19 as a hydraulic source. The hydraulic system comprises a hydraulic circuit 30 between the hydraulic sources such as the MOP 18 and the EOP 19, and oil requiring sites such as the motor-generators 2, 3 and the power distribution device 4. The MOP 18 draws the oil from a not shown oil pan or the like through a strainer 31, and discharges pressurized oil from an outlet 18a connected to an inlet port of a first check valve 32 through a first passage 33. The first passage 33 is connected to a second passage 34 and a third passage 35 at a position where the first check valve 32 is disposed. The first check valve 32 allows the oil to flow in a direction from the outlet 18a toward the second and the third passages 34 and 35. A structure of the first check valve 32 will be described later in more detail.

Specifically, the second passage 34 provides a communication between an outlet port of the check valve 32 and the oil requiring sites such as the motor-generators 2 and 3 through relief valves 36 and 37 and an oil cooler 38, so as to cool and lubricate coil ends and rotary members of the motor-generators 2 and 3.

The relief valve 36 is opened to drain the oil from the second passage 34 upon exceedance of hydraulic pressure in the second passage 34 above a predetermined level. The relief valve 37 is an auxiliary relief valve that is used instead of the relief valve 36 in case of a failure of the relief valve 36. Those relief valves 36 and 37 are arranged in series with each other. For example, a water-cooled type oil cooler may be used as the oil cooler 38, and the oil cooler 38 is disposed between the relief valve 37 and the oil requiring sites to cool the oil flowing through the second passage 34.

The third passage 35 provides a communication between the outlet port of the check valve 32 and the oil requiring sites such as the first motor-generator 2 and the power distribution device 4 through a orifice 39, so as to cool and lubricate gears and rotary members of the power distribution device 4 as well as the coil end and the rotary members of the first motor-generator 2. In addition, the first motor-generator 2 is also lubricated by the oil scattered by a rotation of the ring gear 15 of the differential gear 14.

As described, the second motor-generator 3 is driven in both first EV mode and second EV mode, while the first motor-generator 2 is driven together with the second motor-generator 3 in the second EV mode. In the second EV mode, a rotational speed of each pinion gears of the power distribution device 4 is also increased by torque of the first motor-generator 2 in addition to that of the second motor-generator 3 and hence a load applied to each pinion gear is increased. Consequently, a temperature of each pinion gear is especially raised in the second EV mode. In this situation, therefore, the oil has to be delivered to lubricate and cool the power distribution device 4. That is, the second motor-generator 3 is operated more frequently than the first motor-generator 2 under the EV mode, and hence the second motor-generator 3 requires relatively large amount of oil. By contrast, the first motor-generator 2 and the power distribution device 4 are not operated as frequently as the second motor-generator 3, and hence each required amount of the oil to the first motor-generator 2 and to the power distribution device 4 is smaller than that required by the second motor-generator 3.

An air purge passage 41 provides a communication between the outlet 18a of the MOP 18 and the third passage 35 through an orifice 40 to let the air in the first passage 33 flow therethrough. Given that the first check valve 32 is closed without arranging the air purge passage 41, the first passage 33 is closed completely and hence air would remain in the first passage 33 while the MOP 18 is stopped. In this case, an establishment of the hydraulic pressure may be delayed by the remaining air in the first passage 33 when starting the MOP 18. In order to avoid such disadvantage, the air purge passage 41 and the orifice 40 are arranged so that the air remaining in the first passage 33 is allowed to flow toward the oil requiring sites of the power distribution device 4.

The EOP 19 is disposed in parallel to the MOP 18. As the MOP 18, the MOP 19 pumps up the oil through the strainer 31 and discharges pressurized oil from an outlet 19a connected to the second passage 34 through a second check valve 42. The second check valve 42 is adapted to allow the oil to flow only in a direction from the outlet 19a toward the second passage 34.

In the hydraulic circuit 30 shown in FIG. 2, when the engine 1 is stopped and hence the hydraulic pressure cannot be established by the MOP 18, the EOP 19 may be activated by the pumping motor 20 to deliver the pressurized oil to the first motor-generator 2, the second motor-generator 3 the power distribution device 4.

As previously mentioned, dimensions and cost of the hydraulic system having both mechanical oil pump and electric oil pump have to be increased in comparison with those of conventional systems having no electric oil pump. In order to avoid such increment in size and cost of the hydraulic system, according to the preferred example, the first check valve 32 is disposed at a junction among the first passage 33, the second passage 34 and the third passage 35.

Figure 3:
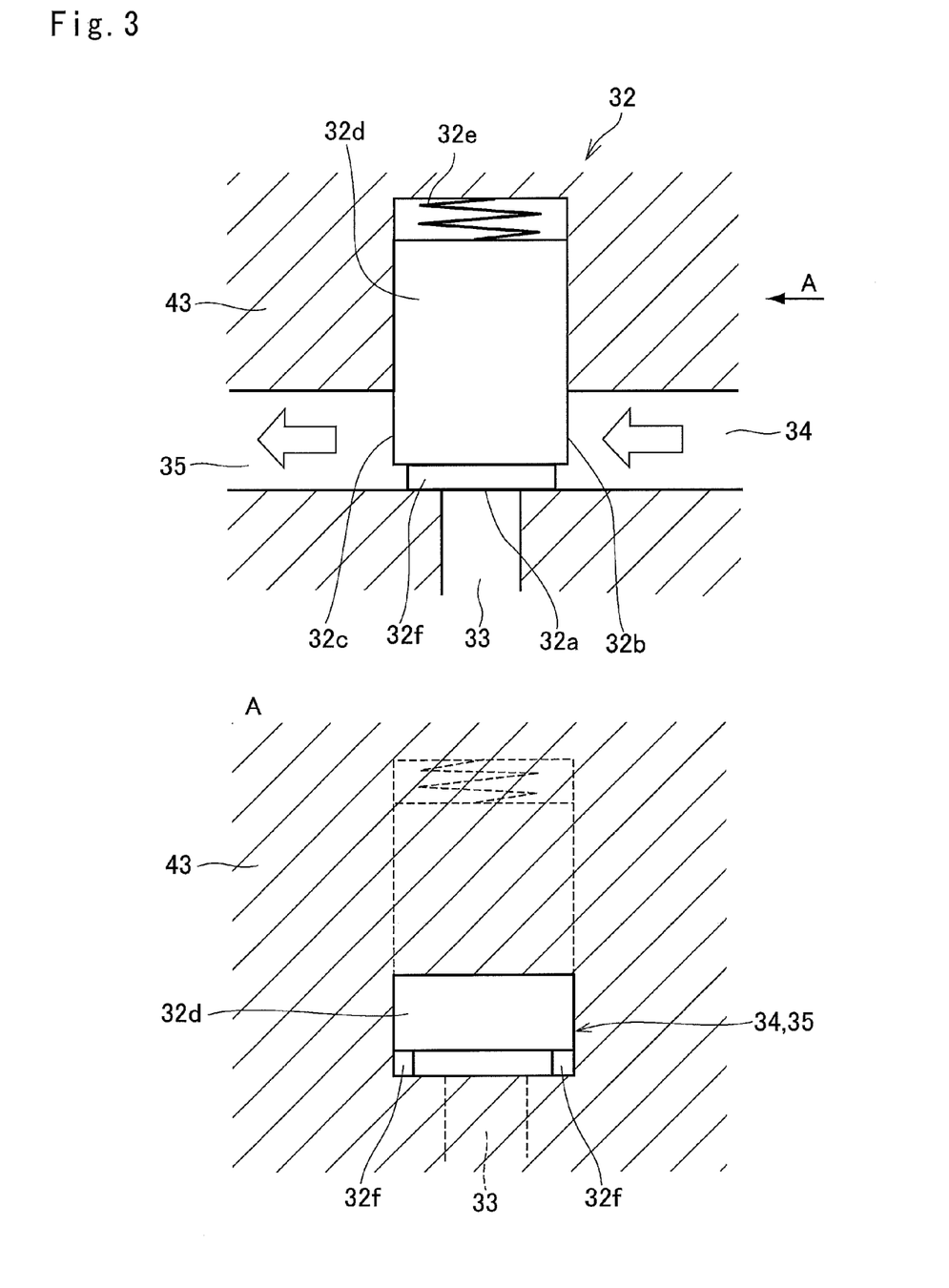
FIG. 3 is a view showing a first example of a structure of a check valve employed in the hydraulic system of the vehicle show in FIG. 1.

Turning now to FIG. 3, there is shown a first example of a structure of the first check valve 32. As illustrated in FIG. 3, the first check valve 32 comprises a first port 32a as an inlet port, and a second port 32b and a third port 32c as outlet ports. The first check valve 32 further comprises a valve element 32d fitted into a valve body 43, and a spring 32e.

The first port 32a is connected to the outlet 18a of the MOP 18 through the first passage 33. The second port 32b is connected to an outlet port of the second check valve 42 through the second passage 34. The third port 32c is connected to the oil requiring sites of the first motor-generator 2 and the power distribution device 4 through the third passage 35.

The valve element 32d is elastically pushed by the spring 32e to close the first port 32a. When the hydraulic pressure greater than the elastic force of the spring 32e is applied to the first port 32a, the valve element 32d is withdrawn to open the first port 32a while compressing the spring 32e. That is, the first check valve 32 is adapted to allow the oil to flow only in a direction from the outlet 18a of the MOP 18 to the second and the third ports 32b and 32c, but to block the oil flowing from those ports toward the MOP 18.

Additionally, in order to allow the oil to flow between second port 32b and the third port 32c even when the first port 32a is closed by the valve element 32d, a through guide 32f is formed on a leading end of the valve element 32d of the first port 32a side. According to the first example shown in FIG. 3, the through guide 32f is formed by diametrically reducing the leading end of the valve element 32d to form a diametrical gap on the leading end. An outer diameter of a main body of the valve element 32d is large enough to close the second port 32b and the third port 32c, however, the oil is allowed to flow between the second passage 34 and the third passage 35 through a clearance created beside the diametrically reduced through guide 32f even when the valve element 32d is pushed onto a not shown valve seat to close the first port 32a.

Here, when the first check valve 32 opens the first port 32a, all of the first port 32a, the second port 32b and the third port 32c are connected to one another.

Additionally, a flow area of the clearance beside the through guide 32f is smaller than those of the passages 34 and 35, so that the through guide 32f can serves as a flow rate adjuster such as an orifice and a throttle valve in the passages 34 and 35. Thus, the through guide 32f is formed between an outlet side of the second check valve 42 and the oil requiring sites of the first motor-generator 2 and the power distribution device 4 to serve as an orifice for adjusting the flow rate therebetween.

Figure 4:
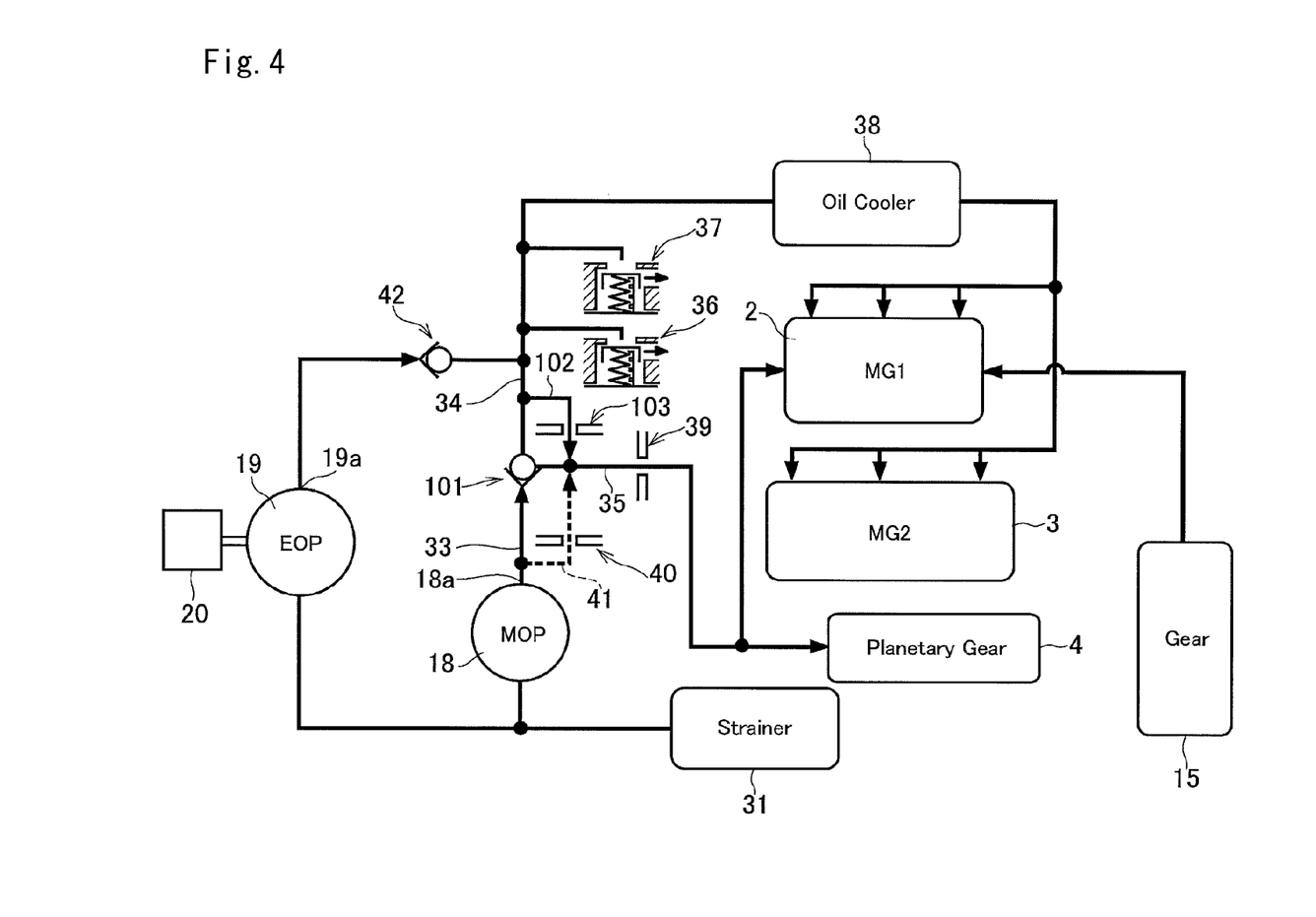
FIG. 4 is a view showing one example of a hydraulic circuit to which the present invention is not applied.

According to the first example, the hydraulic system can be downsized and number of parts can be reduced to save the cost thereof by thus arranging the first check valve 32 having the through guide 32f in the hydraulic circuit 30. By contrast, given that the hydraulic circuit 30 is not provided with the first check valve 32 thus structured, videlicet, given that a conventional check valve 101 is used instead of the first check valve 32 as illustrated in FIG. 4, a passage 102 that provides a communication between the second and the third passages 34 and 35, and an orifice 103 that adjusts a flow rate of the oil passing through the passage 102 have to be arranged additionally in the hydraulic circuit 30. To this end, a space for forming the passage 102 has to be ensured thereby increasing the size of the hydraulic system, and the orifice 103 has to be formed on the passage 102 thereby increasing the cost of the hydraulic circuit 30.

Figure 5:
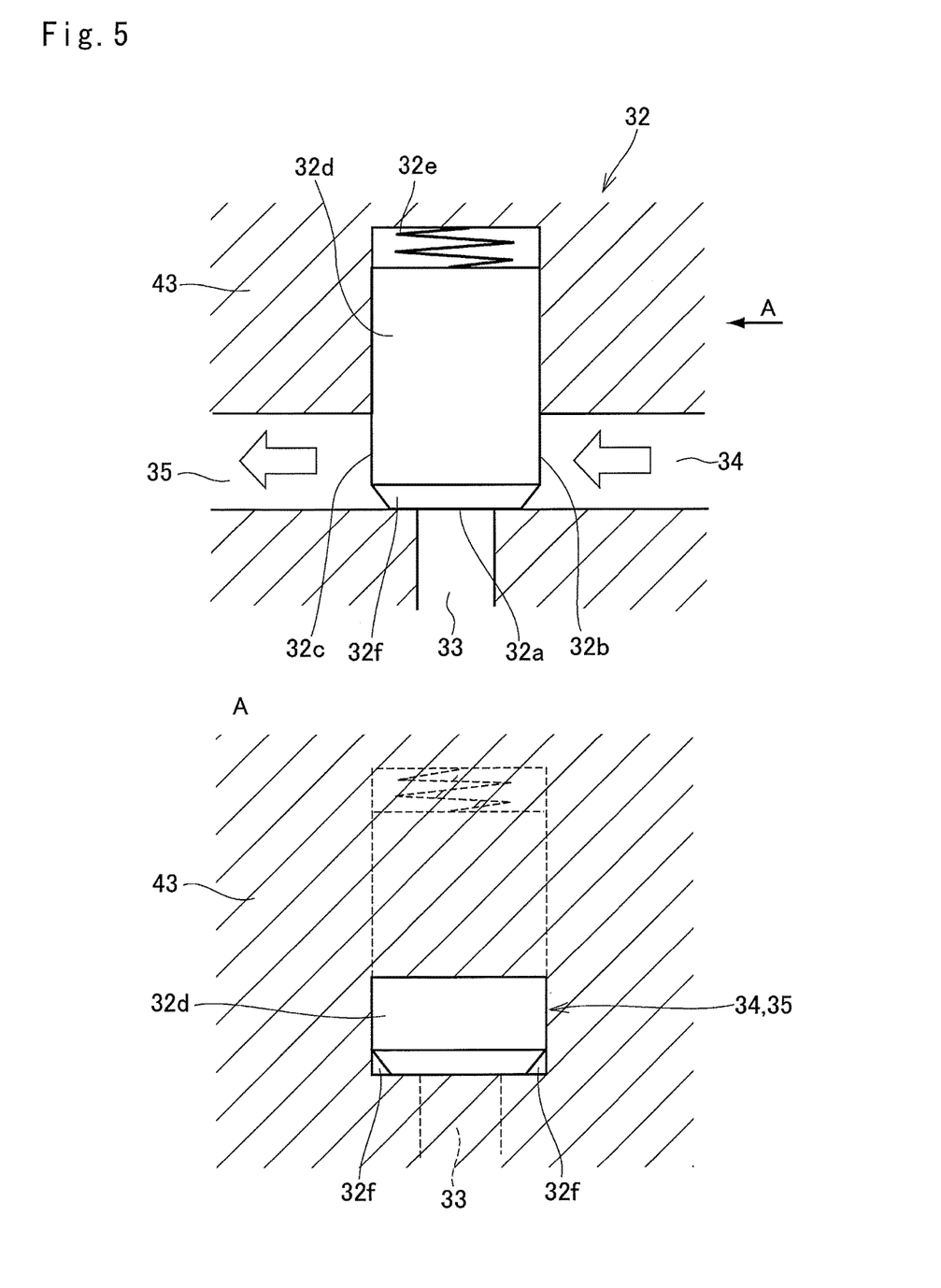
FIG. 5 is view showing a second example of the structure of the check valve employed in the hydraulic system of the vehicle show in FIG. 1.
Figure 6:
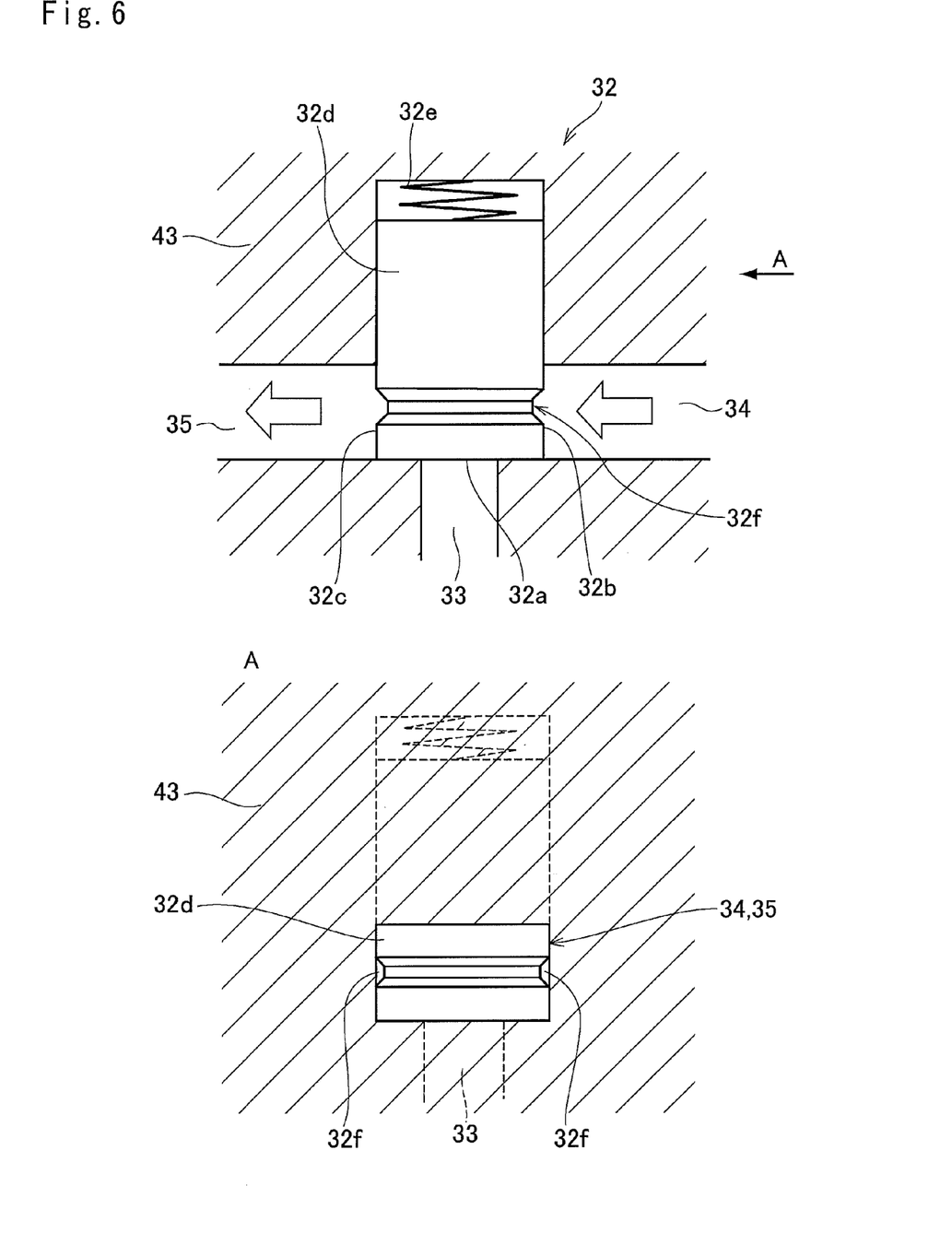
FIG. 6 is a view showing a third example of the structure of the check valve employed in the hydraulic system of the vehicle show in FIG. 1.
Figure 7:
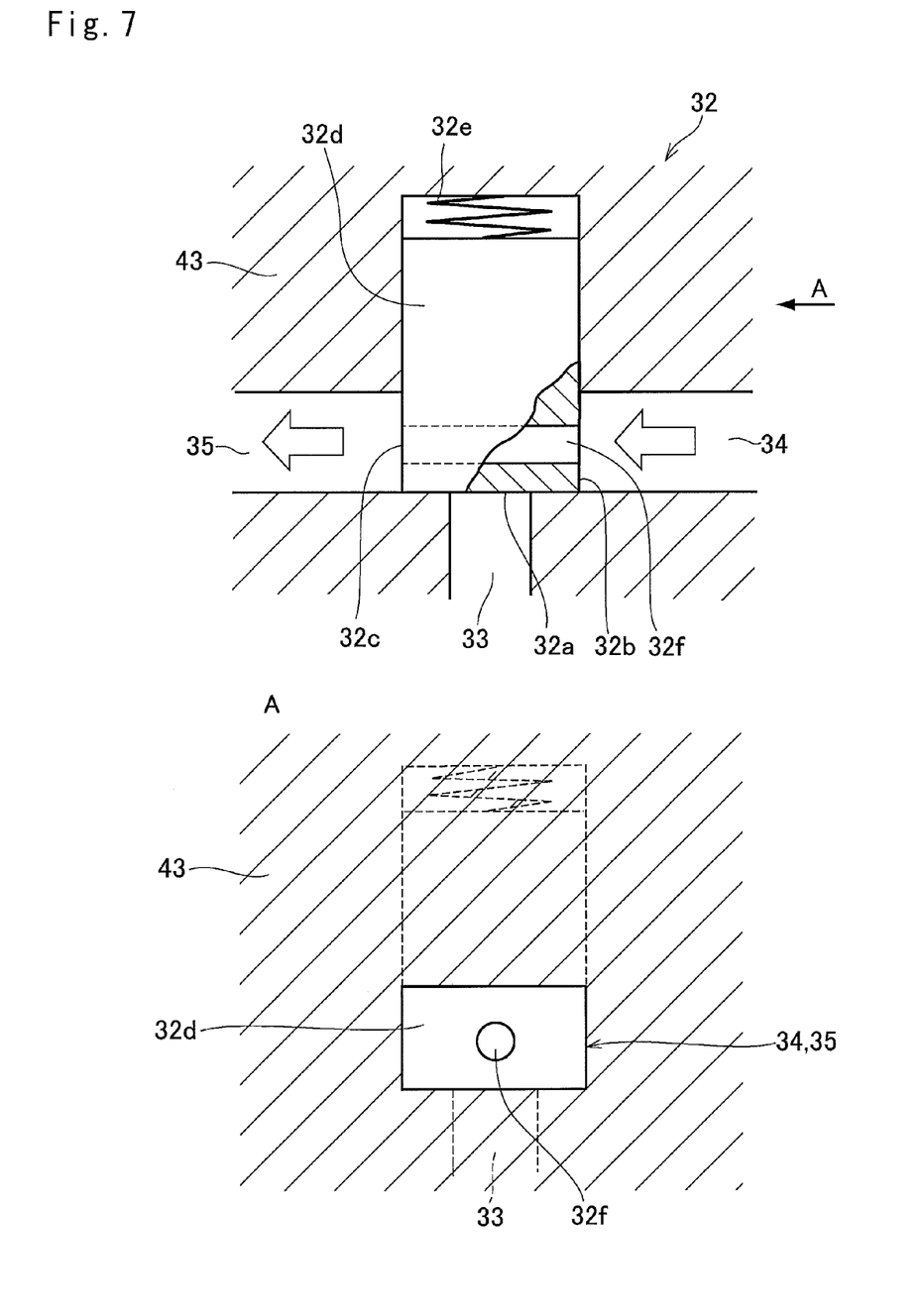
FIG. 7 is view showing a fourth example of the structure of the check valve employed in the hydraulic system of the vehicle show in FIG. 1.

A shape and a position of the through guide 32f are not limited to the first example shown in FIG. 3 but may be modified arbitrarily as shown in FIGS. 5, 6 and 7. For example, according to the second example shown in FIG. 5, the through guide 32f on the leading end of the valve element 32d may be formed into a conically tapered guide.

As illustrated in FIG. 6, according to the third example, the through guide 32f formed by diametrically reducing the valve element 32d may be displaced heightwise within the passages 34 and 35.

As illustrated in FIG. 7, according to the forth example, the through guide 32f may also be formed into a through hole penetrating through the valve element 32d in a direction to provide a communication between the second port 32b and the third port 32c.

The check valves 32 shown in FIGS. 3, 5, 6 and 7 may be also be used at other junction. For example, in the hydraulic circuit 50 shown in FIG. 8, the oil discharged from the EOP 19 is delivered to another oil requiring site 51 in addition to the first and the second motor-generators 2 and 3 as well as the power distribution device 4. In this case, a second check valve 52 having any one of structures shown in FIGS. 3, 5, 6 and 7 is disposed at a junction among the EOP 19 and the oil requiring sites.

Figure 8:
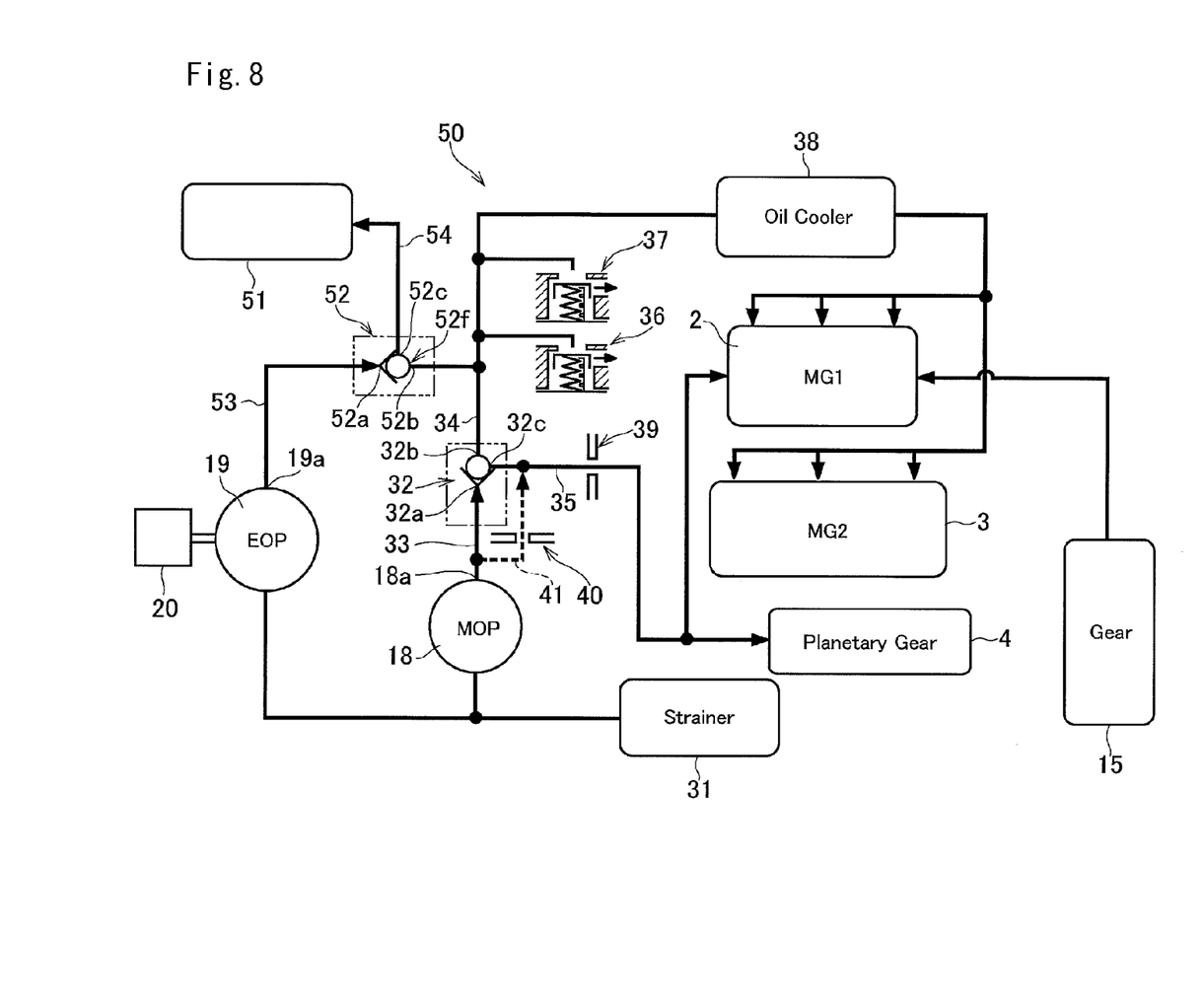
FIG. 8 is another example of a hydraulic circuit according to the hydraulic system.

The second check valve 52 also comprises a first port 52a as an inlet port, and a second port 52b and a third port 52c as outlet ports. The first port 52a is connected to the outlet 19a of the EOP 19 through a fourth passage 54. The second port 52b is connected to the second port 32b as an outlet port of the first check valve through the second passage 34. The third port 52c is connected to another oil requiring site 51 through the fourth passage 54.

The second check valve 52 further comprises a valve element and a spring, and is adapted to allow the oil to flow only in a direction from the outlet 19a of the EOP 19 toward the second and the third ports 52b and 52c, but to block the oil flowing from those ports toward the EOP 19.

In order to allow the oil to flow between second port 52b and the third port 52c even when the first port 52a is closed by the valve element, a through guide 52f having any one of the structures of the through guides 32f shown in FIGS. 3, 5, 6 and 7 is formed on the valve element. That is, as the through guides 32f of the first check valve 32, the through guide 52f serves as an orifice for adjusting flow rate of the oil flowing through the passage between the second port 32b of the first check valve 32 and other oil requiring site 51.

Therefore, the hydraulic circuit 50 can be downsized and number of parts can be reduced to save the cost thereof by thus arranging the second check valve 52 having the through guide 52f. In addition, since the through guide 52f also serves as the orifice, the number of parts can be reduced.

The control system of the present invention may be applied to vehicles other than the vehicle Ve having the engine 1, the first motor-generator 2 and the second motor-generator 3. Specifically, the control system may be applied to any kind of vehicles having a mechanical oil pump activated by the prime mover and an electric oil pump activated by the electric motor, e.g., a hybrid vehicle having an engine and a single motor-generator, and a vehicle driven by an engine.

What is claimed is:

1. A hydraulic system for a vehicle, comprising:
a first oil pump that is driven by a prime mover of a vehicle to generate hydraulic pressure;
a second oil pump that is driven by its own electric motor other than an electric motor serving as the prime mover to generate hydraulic pressure;
an oil requiring site to which the oil discharged from the first oil pump and the second oil pump is delivered;
a first check valve that is disposed between an oil requiring site to which the oil discharged from the first oil pump or the second oil pump is delivered, and that is adapted to allow the oil to flow only in a direction from the first oil pump toward the oil requiring site by opening an inlet port; and
a second check valve that is disposed between the oil requiring site and the second oil pump, and that is adapted to allow the oil to flow only in a direction from the second oil pump toward the oil requiring site by opening an inlet port;
wherein the first check valve comprises a first port as the inlet port that is connected to an outlet of the first oil pump, a second port that is connected to an outlet port of the second check valve, and a third port that is connected to the oil requiring site; wherein the first check valve is adapted to provide a communication among those three ports by opening the first port; and wherein the first check valve further comprises a through guide that allows the oil to flow between the second port and the third port even when the first port is closed.

2. The hydraulic system for a vehicle as claimed in claim 1, wherein the through guide of the first check valve serves as a flow rate adjuster of the oil flowing through a passage from the second oil pump to the oil requiring site through the second check valve.

3. The hydraulic system for a vehicle as claimed in claim 2, wherein the oil flowing through the through guide is delivered to the oil requiring site at which a requiring amount of the oil is relatively small.

4. The hydraulic system for a vehicle as claimed in claim 2,
wherein the vehicle includes a hybrid vehicle, comprising an engine, a first motor and a second motor serving as the prime mover,
a planetary gear unit serving as a power distribution device that distributes a power of the engine to the first motor and to an output member by a differential action, and
a transmission that is connected to the second motor, and that transmits the power between the output member and the driving wheels, and
wherein the oil flowing through the through guide is delivered to at least the planetary gear unit.

5. The hydraulic system for a vehicle as claimed in claim 3,
wherein the vehicle includes a hybrid vehicle, comprising an engine, a first motor and a second motor serving as the prime mover,
a planetary gear unit serving as a power distribution device that distributes a power of the engine to the first motor and to an output member by a differential action, and
a transmission that is connected to the second motor, and that transmits the power between the output member and the driving wheels, and
wherein the oil flowing through the through guide is delivered to at least the planetary gear unit.

* * * * *